United States Patent Office 3,848,026
Patented Nov. 12, 1974

3,848,026
RUBBERY VULCANIZABLE COMPOSITION
Toshio Yoshimoto, Takaaki Imamura, Kazuo Tanaka, and Arata Miyagi, Tokyo, Japan, assignors to Bridgestone Tire Company Limited, Tokyo, Japan
No Drawing. Application Aug. 19, 1970, Ser. No. 64,959, now Patent No. 3,798,190, which is a continuation-in-part of abandoned application Ser. No. 677,731, Oct. 24, 1967. Divided and this application Sept. 11, 1973, Ser. No. 396,132
Claims priority, application Japan, Nov. 3, 1966, 41/72,485
Int. Cl. C08d 9/08; C08f 29/12
U.S. Cl. 260—888                    2 Claims

ABSTRACT OF THE DISCLOSURE

A rubbery vulcanizable composition having an increased green strength, which comprises a blend of (a) at least one polymer selected from the group consisting of natural rubber, polyisoprene, styrene-butadiene copolymer, polybutadiene, butyl rubber and ethylene-propylene terpolymer and (b) from 5 to 95 parts by weight of an hydrogenated copolymer per 100 parts by weight of said blend, said hydrogenated copolymer having polymeric monomer units which consist of (1) styrenic units,
(2) conjugated diolefinic units, and
(3) hydrogenated conjugated diolefinic units, wherein the styrenic units are randomly distributed in the polymeric monomer units.

---

This is a division, of application Ser. No. 64,959, filed Aug. 19, 1970, now U.S. Pat. No. 3,798,190 which is a continuation-in-part of Ser. No. 677,731.

This invention relates to a new rubbery, vulcanizable composition having increased green strength and other properties such as good heat resistance, high resilience and high tensile strength after vulcanization. The term green strength in this specification means the tensile strength of a rubbery polymer or a rubbery composition in the vulcanized state.

This application is a continuation-in-part of the copending application Ser. No. 677,731, filed on Oct. 24, 1967, now abandoned.

The first object of this invention is to provide a method for improving the aging properties, resilience and green strength of natural rubber, polyisoprene and styrene-butadiene copolymer and to provide a new rubbery vulcanizable composition suitable for high-speed tires and other articles.

The second object of this invention is to provide a method for improving the green strength and tensile strength after vulcanization of polybutadiene and to provide a new rubbery vulcanizable composition suitable for tires and other articles.

The third object of this invention is to provide a method for improving the green strength and high temperature aging properties after vulcanization of butyl rubber and ethylene-propylene terpolymer and to provide a new rubbery vulcanizable composition for rubber articles exposed to high temperature conditions.

Other and further objects of this invention will become apparent to those skilled in the art upon consideration of the accompanying disclosure.

The first object of this invention will be understood by the following description. Natural rubber, polyisoprene and styrene-butadiene copolymer are the main rubbers used for high-speed tires, such as radial tires. It is necessary for a high-speed tire to have a high uniformity of tire construction as well as heat-aging resistance and low heat-build-up of used vulcanizates. High uniformity is attained by a large green strength of the unvulcanized rubber at the step of forming the green case of a tire. Low heat-build-up is attained by high resilience of used rubber.

We found that the aging properties, resilience and green strength of natural rubber, polyisoprene and styrene-butadiene copolymers are remarkably improved by blending them with an hydrogenated copolymer consisting of styrenic units, conjugated diolefinic units and hydrogenated conjugated diolefinic units, the styrenic units being randomly distributed in the hydrogenated copolymer. Further we found that the properties required for high-speed tires are not deteriorated by such blending but are improved in some respects. For example, tensile strength after vulcanization of styrene-butadiene copolymer is remarkably improved.

Therefore, the present invention provides a rubbery vulcanizable composition comprising a blend of (a) at least one polymer selected from the group consisting of natural rubber, polyisoprene and a styrene-butadiene copolymer and (b) from 5 to 95 parts by weight of an hydrogenated copolymer per 100 parts by weight of said blend, said hydrogenated copolymer having a secondary transition temperature over —100° C. and polymeric monomer units which consist of (1) styrenic units of from 5 to 60 percent by weight,
(2) conjugated diolefinic units of more than 2 percent by weight and
(3) hydrogenated conjugated diolefinic units of more than 10 percent by weight, wherein the styrenic units randomly distributed in the polymeric monomer units.

The hydrogenated copolymer utilized in the present invention is prepared by selectively and non-destructively hydrogenating diolefinic units of the random copolymer formed from polymerizing styrene and a conjugated diolefin in the presence of the special soluble catalyst described infra.

The styrene content of the starting copolymer of styrene and a conjugated diolefin prior to hydrogenation may be widely varied. From 5 to 60 percent by weight of styrene content is preferably used, since a copolymer having more than 60 percent of styrene by weight provides a resinous hydrogenated copolymer and a copolymer having less than 5 percent of styrene by weight provides an hydrogenated copolymer with a poor roll-processibility. From 10 to 30 percent by weight of styrene content is more preferably used.

The amount of the hydrogenated conjugated diolefinic units may be varied widely, but more than 10 percent by weight of the hydrogenated conjugated diolefinic units is preferable to exhibit their features and at least 2 percent by weight of the remaining conjugated diolefinic units is preferable to allow the copolymer to covulcanize with a rubber to be blended with the hydrogenated copolymer.

The content of the hydrogenated copolymer to be blended with natural rubber, polyisoprene and a styrene-butadiene copolymer may be varied widely. From 5 to 95 parts by weight of the hydrogenated copolymer are blended per 100 parts by weight of the blend depending upon the uses of the resulting rubbery compositions. The larger the amount of the hydrogenated copolymer, the higher the green strength, aging resistance and resilience of the rubbery composition of the present invention.

The second object of this invention will be understood by the following description. Compounds made from polybutadiene as the only rubber cannot be used in tires, in spite of its good abrasion-resistance and high resilience, since it has poor green strength, poor roll-processibility and poor tensile strength after vulcanization.

We found that three disadvantages of polybutadiene are remarkably improved by blending it with an hydrogenated copolymer consisting of styrenic units, conjugated diolefinic units and hydrogenated conjugated diolefinic units, the styrenic units being randomly distributed in the hydrogenated copolymer. Further, we found that the properties required for tires are not deteriorated by such blending but are improved in some respects. For example, by such blending the poor heat resistance of polybutadiene is improved.

The present invention provides a rubbery vulcanizable composition comprising a blend of (a) polybutadiene and (b) from 20 to 95 parts by weight of a hydrogenated copolymer per 100 parts by weight of said blend, said hydrogenated copolymer having a secondary transition temperature over 100° C. and polymeric monomer units which consist of (1) styrenic units of from 5 to 60 percent by weight,
(2) conjugated diolefinic units being larger by weight than hydrogenated conjugated diolefinic units and
(3) hydrogenated conjugated diolefinic units of more than 10 percent by weight, wherein the styrenic units are randomly distributed in the polymeric monomer units.

The hydrogenated copolymer utilized in the present invention is prepared by selectively and non-destructively hydrogenating diolefinic units of the random copolymer formed from styrene and conjugated diolefin in the presence of the special soluble catalyst described later. The content of styrene in the copolymer may be varied widely. A copolymer having from 5 to 60 percent by weight of styrene content is preferably used as the starting material, since a copolymer having more than 60 percent of styrene by weight provides a resinous hydrogenated copolymer and a copolymer having less than 5 percent of styrene by weight gives an hydrogenated copolymer with poor roll-processibility. The tensile strength of hydrogenated polybutadiene having no styrene content is lower than that of polybutadiene, and the tensile strength of the blend is too low to be used for tires. From 10 to 30 percent by weight of styrene content is more preferably used.

The greater the amount of the hydrogenated copolymer are blended with a polybutadiene, the higher the tensile strength of the blend. However, a blend of less than 20 parts by weight of the hydrogenated copolymer does not have sufficient tensile strength after vulcanization for tire application. Therefore, from 20 to 95 parts by weight of the hydrogenated copolymer is preferably used. In order to exhibit a remarkably strong tensile strength, it is more preferable to use greater than 50 parts by weight of the hydrogenated copolymer.

Further, it is important to select the proper range of content of the hydrogenated conjugated diolefinic units in the hydrogenated copolymer to obtain good building-tack and the desired tensile strength of the blend of the present invention for tire application. When the hydrogenated conjugated diolefinic unit content is greater than 50 percent by weight a rubbery composition of the present invention will be too hard at room temperature resulting in low building-tack insufficient to form a green case of a tire. When the hydrogenated conjugated diolefinic unit content is less than 10 percent by weight, the green strength and tensile strength of a blend of the present invention will not be improved.

The third object of this invention will be understood by the following description. Ethylene-propylene terpolymer and butyl rubber have superior heat-aging resistance, but they have some demerits at high temperatures over 120° C. Namely, when aging at high temperature over 120° C., the ethylene-propylene terpolymer becomes hard and the brittle, and butyl rubber becomes soft and sticky. These demerits create large obstacles for high temperature uses. On the other hand, green strength is very important for producing uniform rubber articles.

We found that unvalanced heat-deterioration and the green strength of ethylene-propylene terpolymer and butyl rubber are remarkably improved by blending them with a hydrogenated copolymer consisting of styrenic units, conjugated diolefinic units and hydrogenated conjugated diolefinic units, the styrenic units being randomly distributed in the hydrogenated copolymer. Further, we found that the properties necessary for rubber articles exposed to high temperature conditions are not deteriorated by such blending but rather improved in some respects. For example, the tensile strength or tear resistance of ethylene-propylene terpolymer or butyl rubber is remarkably improved, because of good covulcanization between components of the blend.

The present invention provides a rubbery vulcanizable composition comprising a blend of (a) at least one polymer selected from the group consisting of ethylene-propylene terpolymer and butyl rubber and (b) from 5 to 95 parts by weight of an hydrogenated copolymer per 100 parts by weight of said blend, said hydrogenated copolymer having a secondary transition temperature over —100° C. and polymeric monomer units which consist of (1) styrenic units of from 5 to 60 percent by weight,
(2) conjugated diolefinic units of more than 2 percent by weight, and
(3) hydrogenated conjugated diolefinic units being larger by weight than conjugated diolefinic units, wherein the styrenic units are randomly distributed in the polymeric monomer units.

The hydrogenated copolymer utilized in the present invention is prepared by selectively and nondestructively hydrogenating diolefinic units of the random copolymer formed from styrene and conjugated diolefin in the presence of a special soluble catalyst described later.

The styrene content of the starting copolymer of styrene and a conjugated diolefin prior to hydrogenation may be widely varied. From 5 to 60 percent by weight of styrene content is preferably used, since the copolymer with more than 60 percent of styrene provides resinous an hydrogenated copolymer and a copolymer with less than 5 percent of styrene yields hydrogenated copolymer with poor roll-processibility. From 10 to 30 percent by weight of styrene content is more preferably used.

The amounts of the hydrogenated conjugated diolefinic units of the hydrogenated copolymer utilized in the present invention must be larger than the amounts of conjugated diolefinic units in order to attain the object of the present invention. For example, when the amounts of the hydrogenated units are less than the amounts of the unhydrogenated diolefinic units, the blend of the present invention does not possess tensile strength adequate for use in rubber articles exposed in high temperature cricumstances due to improper vulcanization. Further, in order to remarkably improve unvalenced heat-deterioration, it is more preferable that the amounts of the hydrogenated units are more than two times greater than the amounts of unhydrogenated diolefinic units. However, more than 2 percent by weight of unhydrogenated diolefinic units is necessary in order to use an economical vulcanization method using sulfur as a vulcanizing agent.

The content of the hydrogenated copolymer blended with ethylene-propylene terpolymer and butyl rubber may be varied widely. From 5 to 95 parts by weight of the hydrogenated copolymer are blended per 100 parts by weight of the blend depending upon the uses of resulting rubber compositions. The larger the amount of hydrogenated copolymer are, the higher the green strength and heat-deterioration resistance of the rubbery composition of the present invention.

Chlorinated butyl rubbers are usable in the same manner as butyl rubbers in the blend with the hydrogenated copolymer of the present invention.

The copolymers used as starting materials prior to hydrogenation, utilized for attaining all objects of the present invention, may be prepared by bulk polymerization, solution polymerization or emulsion polymerization by the use of radical type initiator, ionic type initiator or Ziegler type initiator. The solution polymerized copolymers are preferably used, because the hydrogenation of the copolymers proceeds under milder conditions, for example, lower temperature, lower hydrogen pressure and shorter reaction time, than that of copolymers prepared by other types of polymerization. A number of catalysts are used in solution polymerization of styrene with conjugated diolefin. Examples of these catalysts include the catalyst based on lithium metal or organolithium compounds, the catalyst obtained by combining transition metal compounds and organometallic compounds of Group 1, 2 or 3 metals, and the Alfin catalyst. It is preferable to combine styrenic units with diolefinic units not in block form but randomly. A desirable rubbery composition suitable for producing rubber articles can be obtained by using the hydrogenated random copolymer.

The hydrogenation of the random copolymer is carried out in a viscous solution by the use of an hydrogenation catalyst. The catalysts which can carry out the selective hydrogenation of diolefinic units may be preferably used. When the styrenic units and the diolefinic units of the copolymer are non-selectively hydrogenated, the obtained copolymer often becomes resin like and is not suitable for manufacturing rubber articles. An ordinary reducing metal catalyst such as Raney nickel and nickel kieselghur makes it necessary to use a large amount of catalyst, a high reaction temperature of from 150 to 200° C. or higher and a high hydrogen pressure in order to hydrogenate the copolymers efficiently, because a solution of the copolymer is highly viscous as compared with that of low molecular weight olefins. These high temperature hydrogenation conditions often cause the degradation of the copolymers and the high molecular weight hydrogenated copolymers are not obtained. Further, these catalysts are easily poisoned by impurities which are removed only with difficulty and further the removal of such catalyst residue from the hydrogenated copolymers after hydrogenation is very difficult. The catalyst residue left in the hydrogenated copolymers tends to deteriorate various properties of the composition or the cured composition containing them. Therefore, the use of an ordinary reducing metal catalyst for preparing the hydrogenated copolymer employed in the present invention is disadvantageous.

One of the suitable catalysts for preparing the hydrogenated copolymer employed in the present invention is the catalyst obtained by mixing an organic compound of a metal selected from the group consisting of nickel, cobalt and iron with an organometallic compound of the metal selected from the group consisting of Group 1, 2 and 3. This catalyst is soluble in the solution copolymer to be hydrogenated, and can carry out the selective hydrogenation of conjugated diolefinic units of the copolymer in a viscous solution form under a mild condition, for example, at near room temperature and under atmospheric pressure of hydrogen. A copolymer of high Mooney viscosity of even greater than 40 can be easily hydrogenated under such a mild condition that said reaction of thermal degradation or gelation does not occur. The obtained polymer has no undesirable properties resulting from the decrease of molecular weight or gel. Therefore, the hydrogenated copolymer prepared by the soluble catalyst has improved properties and does not lose various good properties of the starting polymer. Such an hydrogenated copolymer is suitable for attaining the object of the present invention.

Among the organic compounds of nickel, cobalt or iron, one of the preferable compounds is a metal carboxylate. The metal carboxylates include nickel naphthenate, cobalt naphthenate, iron naphthenate, nickel octanoate, cobalt octanoate and the like. Other preferable compounds are metal chelate compounds. As the chelating groups, β-diketones, β-hydroxycarbonyl compound, 8-hydroxyquinoline and the like may be used. The metal chelate compounds include bis(acetylacetone)nickel,
tris(acetylacetone)cobalt,
bis(ethyl acetoacetate)nickel,
bis(salicylaldehyde)nickel,
bis(8-hydroxyquinoline)nickel,
tris(8-hydroxyquinoline)cobalt,
bis(3,5-diisopropylsalicylic acid)nickel and the like.

Among the organometallic compounds of the metal of Group 1, 2 or 3, a metal hydrocarbyl compound of lithium, magnesium or aluminium is preferably used. Examples of such metal hydrocarbyl compounds include n-butyllithium, diethylmagnesium triethylaluminium, triisobutylaluminium, triamylaluminium, diethylisobutylaluminium and the like. In addition to the organometallic compound, the metal hydrides such as lithiumaluminiumhydride and sodiumborohydride may be used.

Further, in addition the above mentioned two component catalyst, a three component soluble catalyst consisting of the above mentioned two catalytic components and an olefinically or acetylenically unsaturated hydrocarbon is also preferably used. The soluble catalyst consisting of the above mentioned two or three catalytic components is easily removed from the hydrogenated copolymer by adding a polar solvent such as acetone and alcohol to the reaction mixture containing the hydrogenated copolymer to precipitate the polymer. To make the removal of the catalyst residue more effective, it is preferable to contact the reaction mixture with a polar solvent or water containing a small amount of acid. The catalysts used for preparing the hydrogenated copolymer used in the present invention are not limited to the above mentioned soluble catalyst. Other catalysts which can direct the selective hydrogenation of diolefinic units of high molecular weight copolymers without degradation or gelation may be used.

Any usual method may be used in blending a polymer selected from the group consisting of natural rubber, polyisoprene styrene-butadiene copolymer, polybutadiene, butyl rubber and ethylene-propylene terpolymer with the hydrogenated copolymer. A convenient method for preparing such a composition is to blend the materials on a mill roll, in a Banbury mixer or a kneader. The temperature employed in the blending operation may be varied widely depending upon the characteristics of the materials. If desired, rubber chemicals such as a carbon black, a processing oil, an accelerator and sulphur may be compounded with the rubbers. Another convenient method is to mix the solution of rubbery polymers of olefins with the solution of hydrogenated copolymers, after which the resulting solution is treated by conventional methods, such as steam stripping or coagulation in a non-solvent to recover the rubbery composition.

The invention is illustrated in greater detail in the following examples which are not intended, however, to be unduly limitative of the invention.

Example 1

An emulsion-polymerized styrene-butadiene random copolymer (styrene/butadiene: 23/77, ML–4 at 100° C.: 52) was purified by toluene/acetone system, and 5 percent by a weight solution of the copolymer in toluene was prepared. The solution was hydrogenated in the presence of a catalyst prepared by mixing nickel naphthenate and triethylaluminium, the concentration of which were 8 mmol and 24 mmol per liter of the polymer solution respectively, at 25° C. under 10 kg./cm.$^2$ of hydrogen for 8 hours. After the catalyst was removed by adding methanol containing a small amount of hydrochloric acid to the reaction mixtures, the recovered hydrogenated copolymer was dried under a reduced pressure. The hydrogenated random copolymer consisted of styrenic units of 23 percent by weight, but dienic units of 11 percent by weight and hydrogenated butadiene units of 66 percent by weight, which was determined by Kemp-Wijs method (A. R. Kemp and H. Peters: Ind. Eng. Chem., Anal. Ed., 15, 453 (1943)) and the infrared spectrum.

Secondary transition temperature of the hydrogenated copolymer was −37° C., which was measured by differential scanning calorimeter. The hydrogenated copolymer was blended with natural rubber (RSS #3), styrene-butadiene copolymer rubber (#1502 styrene/butadiene= 23/77 by weight, ML-4 at 100° C.: 52) or synthetic polyisoprene rubber (Califlex IR-305) on a mill roll and then the compounding ingredients shown in the following Table 1 were continuously added thereto. The obtained rubbery composition were molded and the green strength was measured by the tension test according to JIS-K-6301. Then, they were cured at 145° C. for 30 to 60 minutes until the arrival of the best cure time defined as the time when the modulus of rubbery composition reached to 90 percent of maximum modulus.

The physical properties of the cured rubber compositions were measured by the method according to JIS-K-6301 and the results are shown in the following Table 1.

copolymer having varying hydrogenated butadiene unit contents.

Example 3

The styrene-butadiene random copolymers having various styrene contents, which were prepared by a conventional emulsion process, were hydrogenated until about half of the butadienic units of the starting polymers were hydrogenated in the same manner as shown in Example 1. The obtained hydrogenated copolymers (a), (b) and (c) consisted of the following units:

|  | (a) | (b) | (c) |
|---|---|---|---|
| Styrenic units (percent by weight) | 18 | 23 | 50 |
| Butadienic units (percent by weight) | 48 | 33 | 25 |
| Hydrogenated butadiene units (percent by weight) | 34 | 44 | 25 |
| Secondary transition temperature (° C.) | −71 | −57 | −28 |

Fifty parts by weight of each hydrogenated copolymer were blended with 50 parts by weight of styrene-butadiene copolymer on a mill roll.

TABLE 1

|  | 1 | 2 | 3 | 4 | 5 | 6 | 7 | 8 | 9 | 10 |
|---|---|---|---|---|---|---|---|---|---|---|
| Natural rubber | 100 | 80 | 50 | 20 |  |  |  |  |  |  |
| Polyisoprene |  |  |  |  | 100 | 50 |  |  |  |  |
| Styrene-butadiene copolymer |  |  |  |  |  |  | 100 | 80 | 50 | 20 |
| Hydrogenated copolymer |  | 20 | 50 | 80 |  | 50 |  | 20 | 50 | 80 |
| Carbon black ISAF [1] | 45 | 45 | 45 | 45 | 45 | 45 | 45 | 45 | 45 | 45 |
| Aromatic oil | 5 | 5 | 5 | 5 | 5 | 5 | 5 | 5 | 5 | 5 |
| Zinc oxide | 5 | 5 | 5 | 5 | 5 | 5 | 5 | 5 | 5 | 5 |
| Stearic acid | 3 | 3 | 3 | 3 | 3 | 3 | 3 | 3 | 3 | 3 |
| Sulfur | 2 | 2 | 2 | 2 | 2 | 2 | 2 | 2 | 2 | 2 |
| N-oxydiethylene-2-benzothiazolesulfen amide | 1 | 1 | 1 | 1 | 1 | 1 | 1 | 1 | 1 | 1 |
| N-phenyl-β-naphthylamine | 1 | 1 | 1 | 1 | 1 | 1 | 1 | 1 | 1 | 1 |
| Green strength (kg./cm.$^2$) | 4.5 | 10.4 | 38.1 | 81.0 | 2.8 | 19.6 | 2.0 | 5.6 | 27.5 | 72.0 |
| Resilience (percent) [2] | 55.8 | 56.6 | 57.6 | 59.0 | 56.0 | 57.8 | 52.1 | 45.4 | 56.9 | 58.8 |
| Tensile strength after aging at 120° C. for 24 hours (kg./cm.$^2$) | 127 | 146 | 172 | 221 | 90 | 168 | 178 | 190 | 221 | 246 |

[1] Abbreviation of Intermediate Super Abrasion Furnace.
[2] Measured by Dunlop method.

These results show that the green strength, resilience and heat-aging resistance of natural rubber, polyisoprene and styrene-butadiene copolymer are improved by blending with the hydrogenated copolymer, and the blending ratio of the hydrogenated copolymer can be varied widely.

Example 2

The hydrogenated emulsion-polymerized styrene-butadiene random copolymers having various contents of hydrogenated butadiene units were prepared in the same manner as shown in Example 1. These hydrogenated copolymers (A), (B), (C) and (D) consisted of the following units:

|  | (A) | (B) | (C) | (D) |
|---|---|---|---|---|
| Styrenic units (percent by weight) | 23 | 23 | 23 | 23 |
| Butadienic units (percent by weight) | 60 | 33 | 18 | 11 |
| Hydrogenated butadiene units (percent by weight) | 17 | 44 | 59 | 66 |
| Secondary transition temperature (° C.) | 64 | −57 | −48 | −37 |

Fifty parts by weight of each hydrogenated copolymer were blended with 50 parts by weight of a styrene-butadiene copolymer (#1502) on a mill roll. Rubbery compositions and cured rubbers were prepared and the physical properties were measured in the same manner as shown in Example 1. The results are shown in the following Table 2.

TABLE 2

|  | Styrene-butadiene copolymer | (A) | (B) | (C) | (D) |
|---|---|---|---|---|---|
| Green strength (kg./cm.$^2$) | 2.0 | 3.5 | 5.4 | 15.2 | 27.5 |
| Resilience (percent) | 52.1 | 53.6 | 56.6 | 56.7 | 56.9 |
| Tensile strength after aging at 120° C. for 24 hours (kg./cm.$^2$) | 178 | 197 | 205 | 215 | 221 |

These results show that green strength, resilience and heat-aging resistance of the styrene-butadiene copolymer are remarkably improved by blending the hydrogenated Rubbery compositions and cured rubbers were prepared and the physical properties were measured in the same manner as shown in Example 1. The results are shown in the following Table 3.

TABLE 3

|  | Styrene-butadiene copolymer | (a) | (b) | (c) |
|---|---|---|---|---|
| Green strength (kg./cm.$^2$) | 2.0 | 15.5 | 5.4 | 3.1 |
| Resilience (percent) | 52.1 | 56.0 | 56.6 | 55.5 |
| Tensile strength after aging at 20° C. for 24 hours (kg./cm.$^2$) | 178 | 182 | 205 | 190 |

These results show that the green strength, resilience and heat-aging resistance of styrene-butadiene copolymer are improved by blending the hydrogenated copolymer having a wide range of styrene content.

Example 4

Hydrogenated emulsion-polymerized styrene-butadiene random copolymers having 23 percent by weight of styrenic units, 45 percent by weight of butadienic units and 32 percent by weight of hydrogenated butadienic units were prepared in the same manner as shown in Example 1. Secondary transition temperature of this copolymer was −63° C. The resulting hydrogenated copolymer was blended with polybutadiene rubber on a mill roll and then the compounding ingredients shown in the following Table 4 were continuously added thereto. The resulting rubbery compositions were molded and the green strength was measured by the same method as shown in Example 1. Then, they were cured in the same manner as shown in Example 1 and tensile strength was measured by the tension test according to JIS-K-6301. The results are shown in the following Table 4.

TABLE 4

|  | 1 | 2 | 3 | 4 |
|---|---|---|---|---|
| Polybutadiene rubber | 100 | 90 | 50 | 20 |
| Hydrogenated copolymer | | 10 | 50 | 80 |
| Carbon black ISAF | 45 | 45 | 45 | 45 |
| Aromatic oil | 10 | 10 | 10 | 10 |
| Zinc oxide | 3 | 3 | 3 | 5 |
| Steric acid | 2 | 2 | 2 | 2 |
| Sulfur | 1.75 | 1.75 | 1.75 | 1.73 |
| N-oxydiethylene-2-benzothiazolesulfenamide | 1 | 1 | 1 | 1 |
| N-phenyl-β-naphthylamine | 1 | 1 | 1 | 1 |
| Green strength (kg./cm.$^2$) | 1.5 | 1.7 | 4.7 | 6.4 |
| Tensile strength (kg./cm.$^2$) | 161 | 169 | 210 | 242 |

These results show that green strength and tensile strength of polybutadiene are improved by blending the hydrogenated copolymer, but more than 20 parts by weight of hydrogenated copolymer are required to improve tensile strength to a sufficient extent to be used for tire application.

Example 5

The hydrogenated emulsion-polymerized styrenebutadiene random copolymers having various contents of hydrogenated butadiene units were prepared in the same manner as shown in Example 1. These hydrogenated copolymers (A), (B) and (C) consisted of the following units:

|  | (A) | (B) | (C) |
|---|---|---|---|
| Styrenic units (percent by weight) | 23 | 23 | 23 |
| Butadienic units (percent by weight) | 54 | 45 | 28 |
| Hydrogenated butadienic units (percent by weight) | 23 | 32 | 49 |
| Secondary transition temperature (° C.) | −64 | −63 | −54 |

Fifty parts by weight of each hydrogenated copolymer were blended with 50 parts by weight of polybutadiene on a mill roll and then the compounding ingredients as shown in Table 4 were continuously added thereto. Tackiness of the obtained compositions was measured by a pick-up type tackmeter at room temperature. Green strength and tensile strength were measured by the same method as shown in Example 4. The results are shown in the following Table 5.

TABLE 5

|  | (A) | (B) | (C) | Polybutadiene |
|---|---|---|---|---|
| Green strength (kg./cm.$^2$) | 4.0 | 4.7 | 13.2 | 1.5 |
| Tensile strength (kg./cm.$^2$) | 207 | 210 | 224 | 161 |
| Tackiness (gr./cm.) | 130 | 160 | 70 | 120 |

These results show that the higher green strengths and tensile strengths of polybutadiene are obtained by blending an hydrogenated copolymer with a greater content of hydrogenated butadienic units. However, a blend of hydrogenated copolymer having more than 50 percent by weight of hydrogenated butadiene units had a too low building-tack to be used for a tire, and the blend of hydrogenated copolymer having less than 10 percent by weight of hydrogenated butadiene units did not exhibit the properties required of the present invention.

Example 6

The styrene-butadiene random copolymers having various styrene contents were hydrogenated until about half of the butadienic units of the starting polymers were hydrogenated in the same manner as shown in Example 1. The obtained hydrogenated copolymers (a), (b), (c) and (d) consisted of the following units:

|  | (a) | (b) | (c) | (d) |
|---|---|---|---|---|
| Styrenic units (percent by weight) | 0 | 18 | 23 | 50 |
| Butadienic units (percent by weight) | 40 | 42 | 39 | 25 |
| Hydrogenated butadienic units (percent by weight) | 60 | 40 | 38 | 25 |
| Secondary transition temperature (° C.) | −70 | −61 | −28 | |

Fifty parts by weight of each hydrogenated copolymer were blended with 50 parts by weight of polybutadiene on a mill roll.

Rubbery compositions and cured rubbers were prepared and the physical properties were measured in the same manner as shown in Example 4. The results are shown in the following Table 6.

TABLE 6

|  | Polybutadiene | (a) | (b) | (c) | (d) |
|---|---|---|---|---|---|
| Green strength (kg./cm.$^2$) | 1.5 | 31.0 | 18.0 | 4.5 | 2.2 |
| Tensile strength (kg./cm.$^2$) | 161 | 128 | 195 | 209 | 190 |

These results show that it is important to use an hydrogenated copolymer having a proper range of styrene content, and the tensile strength of the blend with hydrogenated polybutadiene having 0% styrene content is too low to be used in tires.

Example 7

The styrene-butadiene random copolymer (styrene/butadiene=25/75 by weight, Mooney viscosity at 100° C.=57) was prepared through solution polymerization by the use of a catalyst based upon n-butyllithium. A 15 volume percent solution of the obtained copolymer in n-

TABLE 7

|  | 1 | 2 | 3 | 4 | 5 | 6 | 7 | 8 | 9 | 10 | 11 | 12 |
|---|---|---|---|---|---|---|---|---|---|---|---|---|
| Ethylene-propylene terpolymer (third component: ethylidene-norbornene ML-4=40) | 100 | 75 | 50 | 25 | 50 | | 25 | | | | | |
| Hydrogenated solution-polymerized styrene-butadiene random copolymer (ML-4=120) | | 25 | 50 | 75 | | 25 | | | | 10 | 20 | 30 |
| Solution-polymerized styrene-butadiene random copolymer (styrene/butadiene=25/75 by weight ML-4=57) | | | | | 50 | | | 25 | | | | |
| Chlorinated butyl rubber (ML-4=55) | | | | | | 75 | 75 | 75 | | | | |
| Butyl rubber (ML-4=55) | | | | | | | | | 100 | 90 | 80 | 70 |
| Carbon black (High Abrasion Furnace) | 50 | 50 | 50 | 50 | 50 | 50 | 50 | 50 | | | | |
| Aromatic oil | 5 | 5 | 5 | 5 | 5 | 5 | 5 | 5 | | | | |
| Carbon black (General Purpose Furnace) | | | | | | | | | 70 | 70 | 70 | 70 |
| Spindle oil | | | | | | | | | 30 | 30 | 30 | 30 |
| Tackifier (alkylphenol) | 5 | 5 | 5 | 5 | 5 | 5 | 5 | 5 | | | | |
| Zinc oxide | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | | | | |
| Sulfur | 1.5 | 1.5 | 1.5 | 1.5 | 1.5 | 0.5 | 0.5 | 0.5 | 2 | 2 | 2 | 2 |
| Tetramethylthiurammonosulfide | 1.5 | 1.5 | 1.5 | 1.5 | 1.5 | | | | | | | |
| Tetramethylthiuramdisulfide | | | | | | | | | 1 | 1 | 1 | 1 |
| 2-mercaptoimidazoline | | | | | | 1.5 | 1.5 | 1.5 | | | | |
| Mercaptobenzthiazole | 0.5 | 0.5 | 0.5 | 0.5 | 0.5 | | | | 0.5 | 0.5 | 0.5 | 0.5 |
| Trimethyldihydroquinoline polymer | 2.0 | 2.0 | 2.0 | 2.0 | 2.0 | 1.0 | 1.0 | 1.0 | | | | |
| Magnesium oxide | | | | | | 1.5 | 1.5 | 1.5 | | | | |
| Poly-p-dinitrobenzene | | | | | | | | | 0.5 | 0.5 | 0.5 | 0.5 |
| Cured at 145° C. | | | | | | | | | | | | |
| Tensile strength (kg./cm.$^2$) | 161 | 182 | 197 | 212 | 71 | 142 | 133 | 123 | 99 | 101 | 103 | 106 |
| Elongation (percent) | 400 | 375 | 375 | 360 | 170 | 470 | 310 | 400 | 500 | 460 | 460 | 510 |
| Tear strength (JIS-B kg./cm.) | 47 | 54 | 57 | 57 | 18 | 38 | 31 | 36 | 39 | 35 | 31 | 34 | hexane was hydrogenated at 60° C. under 10 kg./cm.² pressure of hydrogen for 45 minutes in the presence of a catalyst obtained by mixing nickel naphthenate and triethylaluminium in the presence of dicyclopentadiene. The concentration of nickel naphthenate was 1.5 mmol per liter of the copolymer solution to be hydrogenated and the molar ratio of nickel naphthenate/triethylaluminium/dicyclopentadiene was 1/4/1. After hydrogenation, the hydrogenated copolymer was recovered by adding acetone containing a small amount of hydrochloric acid to the copolymer solution and mixing a large amount of methanol with the copolymer solution to precipitate the hydrogenated copolymer. The thus obtained hydrogenated random copolymer consisted of 25 wt. percent of styrenic units, 3.7 wt. percent of butadienic units and 71.3 wt. percent of hydrogenated butadiene units, which was determined by the degree of unsaturation according to the Kemp-Wijs method and an infrared spectrum analysis. The compounded stocks were prepared on a mill roll according to the compounding recipe shown in Table 7 above and were cured to form a sheet. The physical properties were measured according to JIS-K-6301 and the results are shown in the following Table 7.

These results show that the hydrogenated styrene-butadiene random copolymers can covulcanize with other polymers with low unsaturation and provide vulcanizates having desirable properties.

Example 8

The solution-polymerized styrene-butadiene random copolymer (styrene: 25.6 wt. percent, 1,4-cis-butadiene: 18.8 wt. percent, 1,4-trans-butadiene: 31.1 wt. percent, 1,2-butadiene: 24.5 wt. percent) was hydrogenated according to the same method as shown in Example 7. 94.2% of the original butadiene were hydrogenated. Secondary transition temperature of this copolymer was $-55°$ C. The hydrogenated copolymer was compounded with ethylene-propylene terpolymer and other ingredients and then the obtained compounded stocks were cured at 145° C. for 30 minutes.

After the vulcanizates were aged at 160° C or 180° C. for 24 hours in air, their hardness was measured according to JIS-K-6301. The results are shown in the following Table 8.

TABLE 8

| Compounding recipe | 1 | 2 | 3 | 4 | 5 |
|---|---|---|---|---|---|
| Hydrogenated styrene-butadiene random copolymer | | 25 | 75 | | 75 |
| EPT Nordel 100 [1] | 100 | 75 | 25 | | |
| EPT Epsyn 40 [2] | | | | 100 | 25 |
| Carbon black (High Abrasion Furnace) | 50 | | | | |
| Aromatic oil | 5 | | | | |
| Novolac-type aklylphenolformaldehyde resin | 5 | | | | |
| Stearic acid | 1 | | | | |
| Polymerized trimethyl dihydroquinoline | 2 | | | | |
| Zinc oxide | 5 | | | | |
| Sulfur | 1.5 | | | | |
| Tetrathiurammonosulfide | 1.5 | | | | |
| Mercaptobenzothiazole | 0.5 | | | | |

Cured at 145° C. for 30 minutes

| Hardness (°): | | | | | |
|---|---|---|---|---|---|
| Original | 66 | 71 | 70 | 70 | 70 |
| After aging at 160° C. for 24 hours | 72 | 72 | 68 | 74 | 71 |
| After aging at 180° C. for 24 hours | 73 | 74 | 72 | 75 | 72 |

[1] Sold by Du Pont. Third component is 1,4-hexadiene.
[2] Sold by Japan Synthetic Rubber Co. Third component is ethylidenenorbornene.

These results show that the increase of hardness of ethylene-propylene terpolymers after aging can be prevented by blending them with hydrogenated styrene-butadiene random copolymer.

Example 9

The same styrene-butadiene random copolymer as used used in Example 8 was hydrogenated according to the same method as shown in Example 7. Thus, hydrogenated copolymers having different degree of hydrogenation were prepared and then were compounded with butyl rubber and other ingredients. The compounded stocks were vulcanized at 145° C. for 1.5 times of the best cure time and the physical properties of the resulting vulcanizates were measured before and after they were aged at 150° C. for 20 hours in 3 kg./cm.² of air according to JIS-K-6301. The results are shown in the following Table 9.

TABLE 9

| Compounding recipe | 1 | 2 | 3 | 4 |
|---|---|---|---|---|
| Butyl rubber (ESSO-218) | 100 | 70 | 80 | 70 |
| Hydrogenated styrene-butadiene copolymer (hydrogenated butadiene units: 66.8 wt. percent) | | 30 | | |
| Hydrogenated styrene-butadiene copolymer (hydrogenated butadiene units: 71.5 wt. percent) | | | 20 | 30 |
| Poly-p-dinitrosobenzene | 0.25 | | | |
| Carbon black (General Purpose Furnace) | 75 | | | |
| Spindle oil | 32.5 | | | |
| Zinc oxide | 5 | | | |
| Mercaptobenzothiazole | 0.5 | | | |
| Tetramethylthiuramdisulfide | 1 | | | |
| Sulfur | 2 | | | |

Cured at 145° C. for 1.5 times of the best cure time

| Before aging: | | | | |
|---|---|---|---|---|
| Hardness (°) | 55 | 55 | 56 | 54 |
| Elongation (percent) | 510 | 410 | 400 | 520 |
| 300% modulus (kg./cm.²) | 65 | 65 | 88 | 61 |
| Tensile strength (kg./cm.²) | 108 | 89 | 105 | 108 |
| After aging: | | | | |
| Hardness (°) | 32 | 49 | 40 | 44 |
| Elongation (percent) | 610 | 420 | 400 | 550 |
| 300% modulus (kg./cm.²) | 9 | 36 | 23 | 27 |
| Tensile strength (kg./cm.²) | 18 | 45 | 27 | 41 |

These results show that the softening of butyl rubber after aging high pressure can be decreased by blending it with the hydrogenated styrene-butadiene random copolymer.

What is claimed is:

1. As a new composition of matter, a rubbery vulcanizable composition comprising a blend of (a) at least one of polymers selected from the group consisting of butyl rubber and ethylene-propylene terpolymer and (b) from 5 to 95 parts by weight of a hydrogenated copolymer per 100 parts by weight of said blend, said hydrogenated copolymer having secondary transition temperature over $-100°$ C. and polymeric monomer units which consist of (1) styrenic units of from 5 to 60 percent by weight,
   (2) butadiene units of more than 2 percent by weight, and
   (3) hydrogenated conjugated diolefinic units of more than 10 percent by weight, wherein the styrenic units are randomly distributed in the polymeric monomer units.

2. The composition as claimed in claim 1 wherein hydrogenated butadienic units of hydrogenated copolymer are more than two times of butadienic units.

References Cited

UNITED STATES PATENTS

| 3,225,122 | 12/1965 | Stumpe | 260—894 |
| 3,554,940 | 1/1971 | Arakawa et al. | 260—5 |
| 3,243,390 | 3/1966 | Hillard et al. | 260—8 |
| 3,242,110 | 3/1966 | Korpman | 260—5 |
| 3,322,856 | 5/1967 | Holden et al. | 260—876 |
| 2,969,341 | 1/1961 | Buckley et al. | 260—888 |
| 3,359,221 | 12/1967 | Schoenbeck | 260—889 |

MURRAY TILLMAN, Primary Examiner

J. ZIEGLER, Assistant Examiner

U.S. Cl. X.R.

260—23.7 M, 33.6 AQ, 42.47, 889, 892, 894